US012711323B2

(12) United States Patent
Thirukazhukundram Subrahma et al.

(10) Patent No.: US 12,711,323 B2
(45) Date of Patent: Aug. 18, 2026

(54) QUESTION AND ANSWERING ON DOMAIN-SPECIFIC TABULAR DATASETS

(71) Applicant: Intuit, Inc., Mountain View, CA (US)

(72) Inventors: Vignesh Thirukazhukundram Subrahma, Bangalore (IN); Arnab Chakraborty, Bangalore (IN); Arkadeep Banerjee, Bangalore (IN); Shrutendra Harsola, Bangalore (IN)

(73) Assignee: Intuit Inc., Mountain View, CA (US)

( * ) Notice: Subject to any disclaimer, the term of this patent is extended or adjusted under 35 U.S.C. 154(b) by 114 days.

(21) Appl. No.: 18/586,379

(22) Filed: Feb. 23, 2024

(65) Prior Publication Data

US 2025/0272505 A1 Aug. 28, 2025

(51) Int. Cl.

| | |
|---|---|
| ***G06F 16/3329*** | (2025.01) |
| ***G06F 16/334*** | (2025.01) |
| ***G06F 40/157*** | (2020.01) |
| ***G06F 40/20*** | (2020.01) |
| ***G06F 40/284*** | (2020.01) |
| ***G06F 40/30*** | (2020.01) |
| ***G06F 40/35*** | (2020.01) |
| ***G06F 40/40*** | (2020.01) |
| ***G06N 3/044*** | (2023.01) |
| ***G06N 3/045*** | (2023.01) |
| ***G06N 3/0455*** | (2023.01) |

(Continued)

(52) U.S. Cl.

CPC .......... *G06F 40/40* (2020.01); *G06F 16/3329* (2019.01); *G06F 16/3344* (2019.01); *G06F 40/30* (2020.01); *G06F 40/35* (2020.01); *G06N 3/044* (2023.01); *G06N 3/045* (2023.01); *G06N 3/0455* (2023.01); *G06N 3/08* (2013.01); *G06N 5/01* (2023.01); *G06N 5/022* (2013.01); *G06N 5/041* (2013.01); *G06F 40/157* (2020.01); *G06F 40/20* (2020.01); *G06F 40/284* (2020.01); *G06N 20/00* (2019.01)

(58) Field of Classification Search

None

See application file for complete search history.

(56) References Cited

U.S. PATENT DOCUMENTS

| | | | | |
|---|---|---|---|---|
| 12,223,080 | B1 * | 2/2025 | Al-Rikabi | G06F 16/243 |
| 12,361,000 | B1 * | 7/2025 | Chen | G06F 16/24542 |

(Continued)

OTHER PUBLICATIONS

Wu Mingxia; Huang Qichun; Chen Qi; Graphical user interface based on multidatabase query optimization; Mar. 7, 2005 URL: https://ieeexplore.ieee.org/document/1398267?source=IQplus (Year: 2005).*

(Continued)

*Primary Examiner* — Richa Sonifrank

(74) *Attorney, Agent, or Firm* — Dinsmore & Shohl LLP

(57) ABSTRACT

Certain aspects of the disclosure provide a question and answering system for answering questions on tabular datasets. In certain aspects, answering questions with the question and answering system includes generating a sequence of operations for answering the user question using a large language model wherein each operation of the sequence of operations encodes a data operation. Answering questions further includes generating an output based on performing the sequence of operations on a tabular dataset; determining a confidence score associated with the output; and presenting the output to the user.

18 Claims, 5 Drawing Sheets

(51) Int. Cl.

| | |
|---|---|
| ***G06N 3/08*** | (2023.01) |
| ***G06N 5/01*** | (2023.01) |
| ***G06N 5/022*** | (2023.01) |
| ***G06N 5/04*** | (2023.01) |
| ***G06N 20/00*** | (2019.01) |

(56) References Cited

U.S. PATENT DOCUMENTS

| | | | | |
|---|---|---|---|---|
| 12,430,343 | B2 * | 9/2025 | Jain | G06F 16/285 |
| 12,436,935 | B1 * | 10/2025 | Brugere | G06F 16/2455 |
| 2013/0238434 | A1 * | 9/2013 | Green | G06Q 40/06<br>705/26.1 |
| 2016/0132415 | A1 * | 5/2016 | Dillard | G06F 11/263<br>714/33 |
| 2024/0143612 | A1 * | 5/2024 | Bigdelu | G06F 16/2425 |
| 2024/0403796 | A1 * | 12/2024 | Ahmed | G06Q 10/067 |
| 2024/0419912 | A1 * | 12/2024 | Somech | G06N 3/044 |
| 2025/0036690 | A1 * | 1/2025 | Nath | G06F 16/93 |
| 2025/0110934 | A1 * | 4/2025 | Dibia | G10L 15/16 |
| 2025/0139128 | A1 * | 5/2025 | Li | G06F 16/285 |
| 2025/0225328 | A1 * | 7/2025 | Chowdhury | G06F 40/30 |
| 2025/0238629 | A1 * | 7/2025 | Malkiel | G06F 40/194 |

OTHER PUBLICATIONS

Matthias Urban, Carsten Binnig; CAESURA: Language Models as Multi-Modal Query Planners; Aug. 7, 2023 URL: https://arxiv.org/pdf/2308.03424 (Year: 2023).*

LangChain. URL https://github.com/langchain-ai/langchain (accessed Feb. 23, 2024).

Naihao Deng, Yulong Chen, and Yue Zhang. 2022. Recent Advances in Text-to-SQL: A Survey of What We Have and What We Expect. In Coling. International Committee on Computational Linguistics, Gyeongju, Republic of Korea. https://aclanthology.org/events/coling-2022/.

Longxu Dou, Yan Gao, Mingyang Pan, Dingzirui Wang, Wanxiang Che, Dechen Zhan, and Jian-Guang Lou. 2022. UniSAr: A Unified Structure-Aware Autoregressive Language Model for Text-to-SQL. https://doi.org/10.48550/ARXIV.2203.07781.

Jonathan Herzig, Pawel Krzysztof Nowak, Thomas Müller, Francesco Piccinno, and Julian Eisenschlos. 2020. TaPas: Weakly Supervised Table Parsing via Pre-training. In Proceedings of the 58th Annual Meeting of the Association for Computational Linguistics. Association for Computational Linguistics, Online, 4320-4333. https://doi.org/10.18653/v1/2020.acl-main.398.

Haoyang Li, Jing Zhang, Cuiping Li, and Hong Chen. 2023. Resdsql: Decoupling schema linking and skeleton parsing for text-to-sql. In Proceedings of the Thirty-Seventh AAAI Conference on Artificial Intelligence (AAAI).

Qian Liu, Bei Chen, Jiaqi Guo, Morteza Ziyadi, Zeqi Lin, Weizhu Chen, and Jian-Guang Lou. 2021. TAPEX: Table pre-training via learning a neural SQL executor. arXiv preprint arXiv:2107.07653 (2021).

Mohammadreza Pourreza and Davood Rafiei. 2023. Din-sql: Decomposed in-context learning of text-to-sql with self-correction. arXiv preprint arXiv:2304.11015 (2023).

Ruoxi Sun, Sercan O Arik, Hootan Nakhost, Hanjun Dai, Rajarishi Sinha, Pengcheng Yin, and Tomas Pfister. 2023. SQL-PaLM: Improved Large Language Model Adaptation for Text-to-SQL. arXiv preprint arXiv:2306.00739 (2023).

Shunyu Yao, Jeffrey Zhao, Dian Yu, Nan Du, Izhak Shafran, Karthik Narasimhan, and Yuan Cao. 2023. ReAct: Synergizing Reasoning and Acting in Language Models. arXiv:2210.03629 [cs.CL].

* cited by examiner

QUESTION AND ANSWERING ON DOMAIN-SPECIFIC TABULAR DATASETS

BACKGROUND

Field

Aspects of the present disclosure relate to a generative artificial intelligence question and answering system for tabular datasets.

Description of Related Art

Many business users consume business key performance indicators (KPI(s)) in order to assess the business entity's overall competitiveness, efficiency, and/or productivity. Some example financial KPIs include revenue, expenses, wages paid, net profit margin, gross profit margin, and/or the like. Timely and accurate performance data allows an entity to evaluate their strengths and weaknesses, mitigate risks, uncover opportunities, and/or improve performance.

In some conventional approaches, this information is gathered into a dataset or data view that can support the computations, aggregations, and filtering to generate the KPIs. The KPIs may be presented via reports, or increasingly, via dashboarding tools. These dashboarding tools allow non-technical users to consume KPIs and other insights.

However, such dashboarding tools have several drawbacks. For example, these dashboards often present too much information, such as too many different KPIs, which may distract from those pertinent to a particular user. Other times, this information is not relevant for a particular domain or missing domain-specific information. Thus, even with a dashboarding tool, a domain and/or data expert may be needed to fully understand the business entity's performance.

As another example, KPIs may have different aliases based on the particular domain context. Thus, a one-size-fits-all approach for KPIs may miss or misunderstand data out of context. A user may be unaware of such a discrepancy and rely on incorrect KPIs affected by the out of context data issues.

As a further example, dashboarding tools often predetermine the availability of KPIs to be calculated based on a business entity's data, such as based on basic business principles. However, such limited selections may not answer all of a business user's questions and generally cannot provide further insights, for example, predictive insights, forecasting, anomalies, and the like.

Accordingly, there is a need for improved systems and methods for end users to interact with and generate insights from business data.

SUMMARY

Certain aspects provide a method for answering questions on domain-specific tabular datasets, comprising: receiving a user question regarding a domain-specific tabular dataset; generating a sequence of operations for answering the user question using a large language model, wherein each operation of the sequence of operations encodes a data operation; generating an output based on performing the sequence of operations on a tabular dataset; and determining a confidence score associated with the output.

Certain aspects provide a method for answering questions on domain-specific tabular datasets, comprising: receiving a user question regarding a domain-specific tabular dataset; generating a sequence of operations for answering the user question using a large language model, wherein each operation of the sequence of operations encodes a data operation; generating an output based on performing the sequence of operations on a tabular dataset; determining a confidence score associated with the output, comprising: converting the sequence of operations to a reference question; generating a first embedding vector representing the reference question; generating a second embedding vector representing the user question; and generating the confidence score based on the difference between the first embedding vector and the second embedding vector; and generating a natural language answer to the user question based on the output and the confidence score.

Other aspects provide processing systems configured to perform the aforementioned methods as well as those described herein; non-transitory, computer-readable media comprising instructions that, when executed by a processor of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
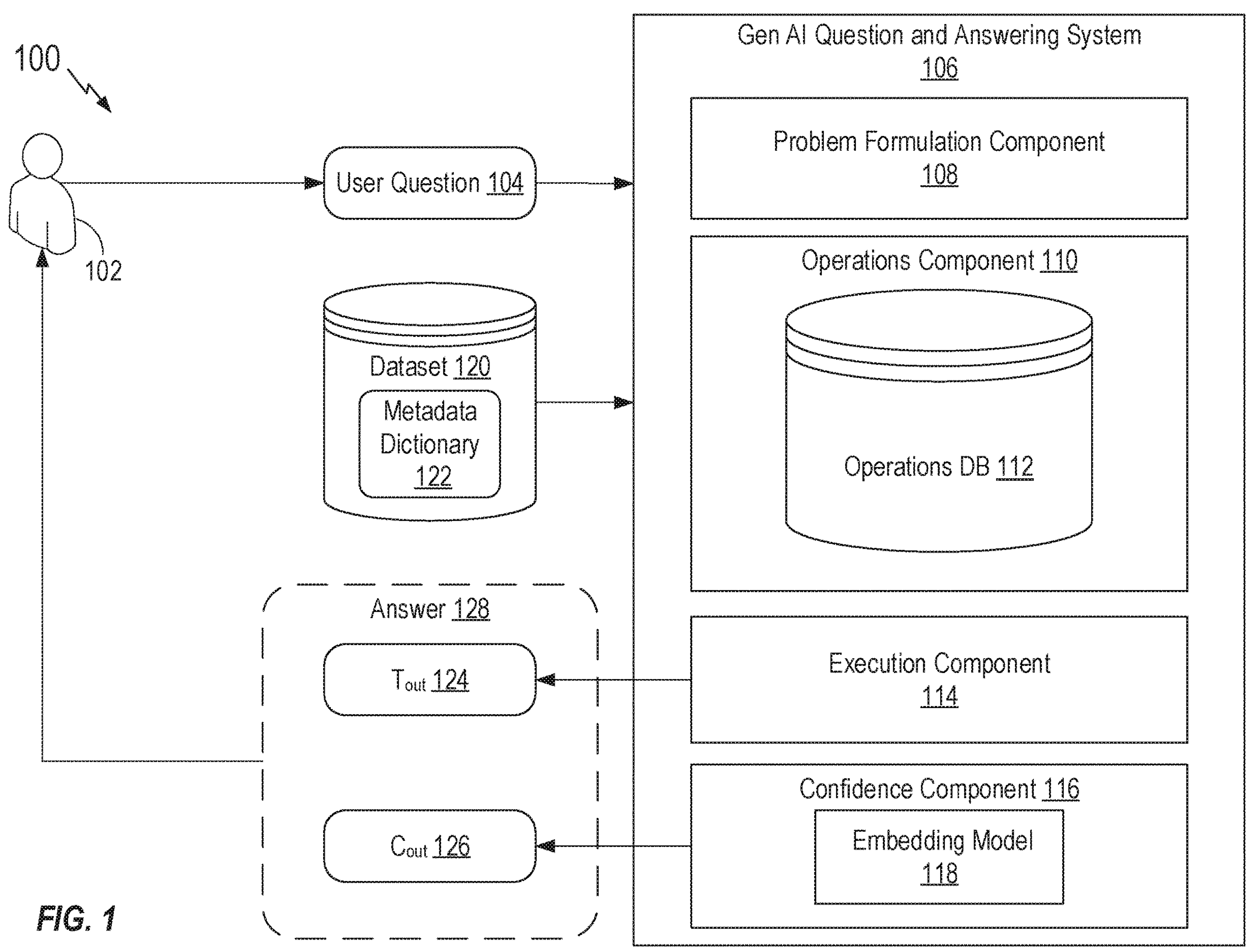
FIG. 1 depicts an example question and answering system for answering natural language queries.

Aspects of the present disclosure provide apparatuses, methods, processing systems, and computer-readable mediums for generative artificial intelligence-based question and answering systems configured to process tabular datasets. Certain aspects provide for generating insights into data into a tabular dataset with a generative artificial intelligence model configured to process a user question associated with the tabular dataset, generate a sequence of data operations configured to, when executed on the tabular dataset, answer the user question.

Generative artificial intelligence (GenAI) is a type of artificial intelligence technology capable of producing various types of content, including text, imagery, audio, code, and/or other types of data. GenAI can produce outputs in the same medium in which it is prompted (e.g., text-to-text) or in a different medium from the given prompt (e.g., text-to-image or text-to-video). Generative AI models use machine learning models, such as neural networks, to identify the patterns and structures within existing data to generate this new and original content.

A prompt is a specific instruction and/or request, posed in natural language, provided to a machine learning model, such as a large language model (LLM), to perform a particular task and/or generate a specific output. In other words, a prompt is input (e.g., a question, a query, a command, etc.) that consists of terms or phrases spoken in plain language without any special format and/or alteration of syntax. In some cases, prompts are generated through a text and/or voice interface.

In the context of natural language processing (NLP) and machine learning, prompts are often used to guide large LLMs in generating text. In particular, an LLM is a type of machine learning model that can perform a variety of NLP tasks, such as generating and classifying text, answering prompts in a conversational manner, and translating text from one language to another. NLP makes it possible for software to "understand" typical human speech or written content as input into an LLM-based system and respond to it by, in some cases, generating human-understandable responses through natural language generation (NLG).

A prompt may be, for example, an information-seeking prompt requesting information retrieval of general and/or domain-specific data, for example, "Please provide Organization X's sales for January 2023." As another example, a prompt may be a task-oriented prompt requesting completion of one or more tasks, for example, "Please draft an invoice for Client Y." A prompt may further be a combination of an information-seeking prompt and a task-oriented prompt to request information retrieval and performance of one or more other tasks.

An LLM may be trained to identify a sequence of actions responsive to an information-seeking prompt and/or a task-orientated prompt, and then orchestrate execution of the sequence of actions. In particular, pre-training an LLM starts with an untrained model (i.e., a model that has randomly initialized weights), which is then trained to predict a next token given a sequence of previous tokens (e.g., to thereby generate one or more responses to various prompts). In the context of LLMs, tokens may be units of text that the models process and generate. Tokens can represent individual characters, words, subwords, phrases, or even larger linguistic units, depending on the specific tokenization (e.g., segmentation of text into meaningful units to capture its semantic and syntactic structure) approach used. Tokens act as a bridge between the raw text data and the numerical representations that LLMs are able to work with. Eventually, training on large amounts of text, the model learns to encode the structure of language in general (e.g., it learns that "I like," for example, may be followed by a noun or a participle) as well as the knowledge included in the raw texts that the model was exposed to during training. For example, an LLM may learn that the sentence "George Washington was . . . " is often followed by "the first president of the United States," and hence has a representation of that piece of knowledge. As such, an LLM may be trained to generate contextually appropriate, text-based responses to a variety of prompts.

In some cases, a prompt may be a combination prompt involving questions related to tabular data, for example, a prompt seeking information from tabular datasets (e.g., data organized in rows and columns) and performing one or more tasks on said tabular data.

Current methods for answering questions related to tabular data include semantic parsing. Semantic parsing converts the natural language question (or prompt) into a logical form that is machine-readable, for example into structured query language (SQL). The SQL query may then be executed on the tabular data to obtain an answer. However, such methods may not achieve the high precision required for real-world use cases. In particular, many semantic parsing methods are domain specific and performance suffers when used in other domains.

Other methods for answering questions related to tabular data use end-to-end modelling, whereby the model learns from both the question and the tabular data set to directly predict the answer, without needing to convert the question into a logical form first. However, these methods are limited to small datasets because they use a single table due to memory limitations and thus are not suitable for use-cases associated with large datasets, such as needed for KPI determination.

Some methods for answering questions related to tabular data utilize agents based on LLMs to perform queries on tabular data, but are limited to basic querying operations, thus restricting the utility of such methods. For example, a CSV agent is capable of filtering, sorting, and single condition querying, however, the CSV agent is not capable of performing complex operations on tabular data.

Accordingly, there is a need for improved methods of generating responses to prompts based on tabular data capable of answering questions for real-world domains with large datasets and complex operations.

Aspects of the present disclosure improve on the state of the art by using LLMs to generate responses to natural language queries on tabular data. In certain aspects, a question and answering system utilizes an LLM to generate a sequence of data operations, which, when executed over the tabular dataset, outputs an answer to a user's natural language query. For example, the LLM processes the natural language query to determine a desired output, which is responsive to the query. The LLM then generates the sequence of data operations which result in the desired output. The LLM then executes the sequence over the tabular dataset to obtain the output and answer the user's query.

Many technical benefits are achieved through the GenAI question and answering system described herein. For example, the GenAI question and answering system beneficially utilizes tabular data to generate answers. Aspects described herein provide an improvement over prior methods, which require sending the data to an LLM to process in order to answer the user question. Tabular data, including large data sets may be used because the LLM uses a metadata dictionary to generate the sequence of operations, rather than directly processing the tabular dataset. Thus, the memory usage of the LLM is reduced. Furthermore, aspects herein reduce hallucination because the LLM is restricted to a defined set of data operations. A hallucination by an LLM is when the model produces an output that appears correct, but has factual inconsistencies and/or discrepancies. For example, the LLM may generate a false answer. Hallucinations may be due to limits in training data, model bias, and the complexity of natural language processes. Aspects herein reduce occurrence of hallucination by defining a limited set of data operations, which are also capable of answering complex questions. The data operations available to the LLM may be small, such as to restrict LLM outputs.

Furthermore, the set of data operations may also be capable of answering complex questions because each data operation may be a building block whereby the model may beneficially generate an ordered combination of data operations to facilitate complex operations. For example, a user may query "What is the revenue for January for Company X?" The model may combine aggregation operations and filtering operations to generate a sequence of data operations to answer the user's question.

Another technical benefit is achieved by aspects described herein to generate a confidence associated with the output, whereby a user may be alerted when a confidence in a generated answer is low to reduce overreliance on a potentially incorrect answer. One limitation generally with utilizing an LLM framework as a question and answering system for natural language queries is due to ambiguity in natural language, for example, users may be imprecise in their natural language queries. As an example, a user may question "What did I earn?" when the user means "What was my net income?" Aspects described herein provide a technical solution, for example, in certain aspects, a confidence of the output may be generated by the LLM. The LLM may utilize the sequence of operations as a prompt to generate a reference question, or the question the sequence of operations answers. This reference question may be compared to the user question to determine the similarity. A confidence score may be determined based on the similarity between the reference question and the user question. Beneficially, then, the confidence score may be provided with the answer to the user's query, indicating how confident the model is in the answer.

Example Question and Answering System

FIG. 1 depicts an example system 100 for generating answers to user-provided natural language queries. As illustrated, system 100 includes a question and answering system 106 $\mathcal{D}$ associated with a dataset 120, e.g., tabular dataset $\mathcal{D}$, which, together, are configured to provide an answer 128 to a user question 104, posed by a user 102. As described herein, answer 128 resolves user question 104 based on dataset 120.

User 102 submits user question 104 to question and answering system 106. User 102 may submit a question through a text interface (e.g., a chat interface), a voice interface (e.g., as through a smart device), and/or the like. In some embodiments, user 102 submits user question 104 through a dashboard, for example, through a text or voice interface of a dashboard. The dashboard may integrate and/or interface with question and answering system 106 through an application programming interface (API), such as a REST API, to generate answer 128 based on user question 104 and dataset 120.

In some embodiments, user question 104 may be provided to question and answering system 106 as text, for example, when received from user 102 through a text interface. In some embodiments, such as when user question 104 is received through a voice interface, spoken word may be transcribed to provide user question 104 to question and answering system as text.

User question 104 may comprise a natural language prompt or query, for example, terms or phrases spoken or entered as they might be spoken, without any special format and/or altering of syntax. User question 104 may inquire into a facet of dataset 120. For example, user question 104 may be "What was Company X's revenue for the past month compared to budgeted revenue?" Other example user questions include: "What was Company X's percentage increase in profits month over month?" or "What was a revenue of Location 1 for Company X last month?" Question and answering system 106 comprises an LLM, for example, a generative pre-trained transformer (GPT) model. For example, problem formulation component 108, operations component 110, execution component 114 and confidence component 116 may comprise one or more aspects of the LLM.

In some embodiments, user question 104 may be provided to question and answering system 106 as a prompt, e.g., as a conversational prompt. In some embodiments, user question 104 may be provided to question and answering system 106 in a structured prompt. A structured prompt may improve performance of the LLM by incorporating instructions, constraints, and/or examples with the prompt to guide the LLM in generating the output. In some embodiments, a prompt may comprise metadata dictionary information, e.g., regarding metadata dictionary 122, data operation information, e.g., regarding data operations in operations database 112, and few-shot examples, e.g., examples of expected output for sample questions, as well as the user question. As described below in further detail, metadata dictionary information and data operation information may be constraints and instructions for generating the sequence of operations. Few-shot examples, also known as few-shot prompting, provides examples or demonstrations within the prompt itself to direct the model generation. The examples may enable contextual learning, e.g., learning based on the prompt itself, because the examples may condition model response.

Problem formulation component 108 of the LLM is configured to translate user question 104 to a structured in Q. For example, a structured input Q of user question 104 consists of a sequence of $r$ tokens, $q_1, \ldots, q_r$. Problem formulation component 108 is trained and configured to generate a structured representation Q of user question 104 that may be used by operations component 110. Problem formulation component 108 may perform one or more NLP tasks, such as semantic analysis, entity extraction, concepts extraction, dependency parsing, topic analysis, and the like, to generate this structured input Q.

Operations component 110 is configured to generate a sequence of operations $\langle O_1, O_2, \ldots O_k \rangle$, which when executed on the associated dataset 120, generate the answer 128 to user question 104. The sequence of operations are selected from the associated operations database 112. Operations database 112 comprises a set of data operations, each data operation formulated as a parameterized basis function, where each function encodes a data operation and associated parameters. A parameterized basis function is a function in which arguments are defined as parameters. Example data operations may include operations such as filtering operations, aggregation operations, trend operations, anomaly operations, and the like. The set of parameterized basis functions may be defined as:

$$\mathcal{F} = \{F_1(p_1), \ldots, F_s(p_s)\}$$

wherein $F_s$ encodes each data operation and $p_s$ encodes the array of parameters associated with $F_s$.

Further, the array of parameters associated with each function define the output of other functions usable as input e.g., one function's output may serve as another function's input. Beneficially, the functions are defined such that each function may utilize the output of other functions, allowing for many combinations and sequences of operations. For example, a filtering operation may utilize the output of a summation operation. Further, the summation operation may utilize the output of the filtering operation, depending on the sequence generated. Each operation may be stored with an explanation of the operation, for example, the parameters associated with the operation and the output of the operation. The number of parameterized basis functions defined in operations database 112 may be relatively low, for example, 10-15 functions, but defined in a manner such that user questions may be answered through a composition of one or more functions. Furthermore, by restricting the output space of the LLM, e.g., reducing the output to basic but fundamental components, here the functions, LLM hallucination may be reduced. These hallucinations may be reduced, for example, because the possible output functions number relatively small. Beneficially, then, hallucinations may be reduced while preserving the number of tasks to be completed, for example, through the combination of sequential data operations. In some embodiments, the parameterized basis functions may be specified by a programming language, for example, SQL or Python.

Furthermore, dataset 120 may include a metadata dictionary $\mathcal{M}$ 122 for the tabular dataset $\mathcal{D}$ with n rows $\{R_1, R_2, \ldots, R_n\}$ and m columns $\{C_1, C_2, \ldots C_m\}$. Metadata dictionary $\mathcal{M}$ 122 may include information associated with each of m columns. Such information may include, for example, a column name, data type, and description, column aliases (i.e., possible alternative names for the column), minimum and maximum values for date and numerical columns, distinct $\mathcal{M}$ values for categorical columns, and the like. Metadata dictionary $\mathcal{M}$ 122 is used by the operations component 110 to indicate the appropriate data (e.g., column or row) for each parameter of a given data operation. A database may be domain-specific, whereby metadata dictionary $\mathcal{M}$ 122 indicates the corresponding data for a given parameter. For example, one domain dataset may use an alternative name for a column and the metadata dictionary $\mathcal{M}$ 122 may indicate the standardized name for the column. Thus, metadata dictionary $\mathcal{M}$ 122 may be utilized to determine one or more available data for one or more parameters associated with the set of parameterized functions.

Operations component 110, constrained by the question Q (e.g., based on user question 104), metadata dictionary $\mathcal{M}$ 122, and the set of parameterized functions $\mathcal{F}$ (i.e., data operations in operations database 112) generates the sequence of operations:

$$LLM(Q, \mathcal{M}, \mathcal{F}) \Rightarrow \langle O_1, O_2, \ldots O_k \rangle$$

where $O_i = f(p_i)$ and $f \in \mathcal{F}$, and $p_i$ in an array of parameter values required for the function $f$, in which the final operation in the sequence outputs a response to user question. Operations component 110 generates the sequence by determining a desired output $\mathcal{T}_{out}$ for the question Q.

Operations component 110 further determines a data operation, from the set of parameterized functions $\mathcal{F}$ stored in operations database 112, based on the explanation of the operations. For example, where the desired output $\mathcal{T}_{out}$ for the question Q is an average, operations component 110 determines one or more data operations that may be used to generate the average, such as an average operation, a summation operation and a count operation. Further, operations component 110 may determine an order associated with the one or more operations, for example, the summation operation and count operation are ordered prior to the average operation. Thereby, an ordered sequence of operations may be generated.

Furthermore, operations component 110 may be constrained by the available data (e.g., in dataset 120) through metadata dictionary $\mathcal{M}$ 122. For example, an operation related to invoice amounts may not be used when the dataset 120 does not include invoice data, as defined by metadata dictionary $\mathcal{M}$ 122.

In some embodiments, operations component 110 is configured to process the input question Q and generate a sequence of operations to obtain the desired output (e.g., an answer to question Q) based on identifying operations in operations database 112 based on the explanation, as well as the available input and parameters for the operation. Operations component 110 is further constrained by the available data in dataset 120, as identified through metadata dictionary 122. If additional operations are needed to obtain an input, then each additional operation is identified and ordered accordingly.

For example, for "average revenue over the last month" operations component determines the function for average (or a set of functions that generates average) and filtering operations, and generates a sequence of these operations by determining an order of the functions to obtain a desired output: average revenue over the last month.

Execution component 114 is configured to execute the sequence of operations over dataset 120 to generate the output $\mathcal{T}_{out}$:

$$\mathcal{T}_{out} = O_k(O_{k-1}(O_1(\mathcal{D}))).$$

$\mathcal{T}_{out}$ 124 may be a structural representation of the answer, and/or all the information needed to generate an answer to user question 104. In some embodiments, question and answering system 106 uses NLP to process $\mathcal{T}_{out}$ 124 to generate a natural language response, which is provided to user 102 as part of answer 128.

Confidence component 116 is configured to generate a confidence associated with $\mathcal{T}_{out}$. As described herein, one drawback to utilizing an LLM framework as a question and answering system is that generally there is not a quantification of the confidence of an output. However, the question and answering system 106, described herein, includes confidence component 116, configured to generate a confidence 126 with the output $\mathcal{T}_{out}$ 124, generated by execution component 114, such as to quantify the confidence of LLM in the output 124.

To generate the confidence $C_{out}$ 126, confidence component 116 is configured to convert the sequence of operations to a reference question Q', where the reference question Q' is the "ideal" question that would be asked by the users to get $\mathcal{T}_{out}$. Specifically, the sequence of operations generated by operations component 110 and executed by execution component 114 is converted to the reference question Q' through code explanation. Code explanation is the process of generating natural-language summaries for code snippets with an LLM. For example, given a code snippet, the code explanation may be "calculate the average of the column titled 'Invoice'."

Confidence component 116 uses code explanation to generate the reference question Q' for which the sequence of operations is answering:

$$< O_1, O_2, \ldots O_k > \Rightarrow Q'$$

For example, for a set of operations to filter the database by column "Invoice", aggregate the values of the column, count the number of rows in the column, and then divide the aggregate value by the count, confidence component 116 may generate a reference question Q' of "What is the average invoice value?"

Then, confidence component 116 can compare the user question Q with the reference question Q' to determine how similar the two questions are. The more similar the questions, the higher confidence that $\mathcal{T}_{\text{out}}$ answers the user question 104.

In some embodiments, the two questions are compared by generating vector embeddings encoding the two questions, Q and Q', for which the dot-product (e.g., the similarity of the two vector embeddings) may be computed. Specifically, user question Q may be embedded as a 1-dimensional vector e through an embedding model 118, for example, a pre-trained SentenceTransformers such as SBERT, which may integrate and/or interface with confidence component 116. Reference question Q' may be embedded as a 1-dimensional vector e', using the same SentenceTransformer.

A confidence score $C_{out}$, may be determined based on determining the similarity between the vector e and e':

$$C_{out} = \sigma(w \cdot (e - e') + b)$$

where σ is the sigmoid activation, · represents the dot-product between two vectors (e.g., e and e'), w is the weight term, and b is the bias term. By determining the dot product, the activation signal for the sigmoid function may be used to form the shallow neural network. This may be done to optimize the weight term w for the task of determining the confidence score. The confidence score 126 is provided to user 102, along with the $\mathcal{T}_{\text{out}}$ 124, as answer 128 in response to user question 104. In some embodiments, for example, where user 102 submits user question 104 through a dashboard, question and answering system 106 may provide answer 128 to the dashboard, such as through an API, for presentation to the user. For example, answer 128 may be presented on a user interface depicting a dashboard.

Figure 2:
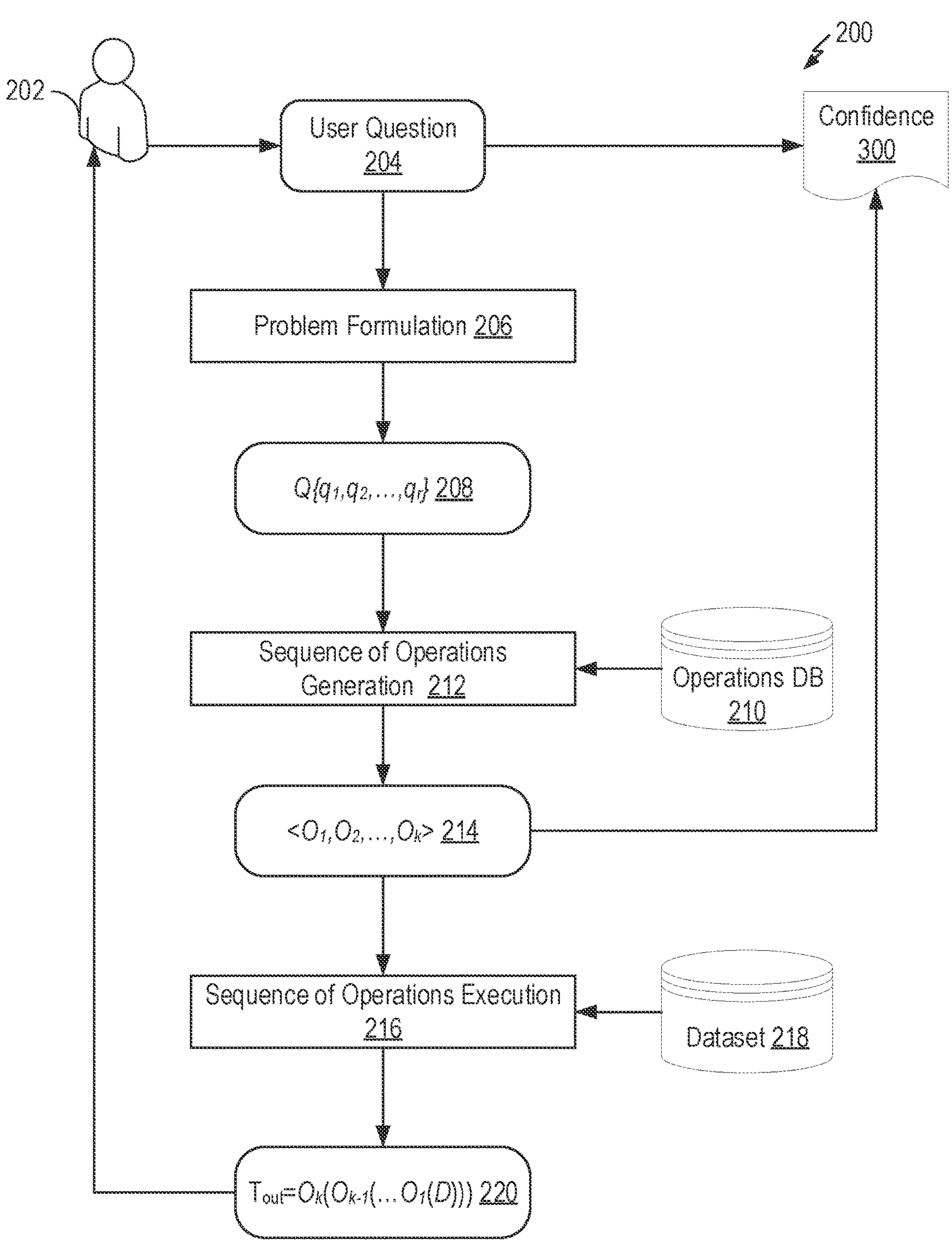
FIG. 2 depicts an example workflow for generating an answer in response to a user question.
Figure 3:
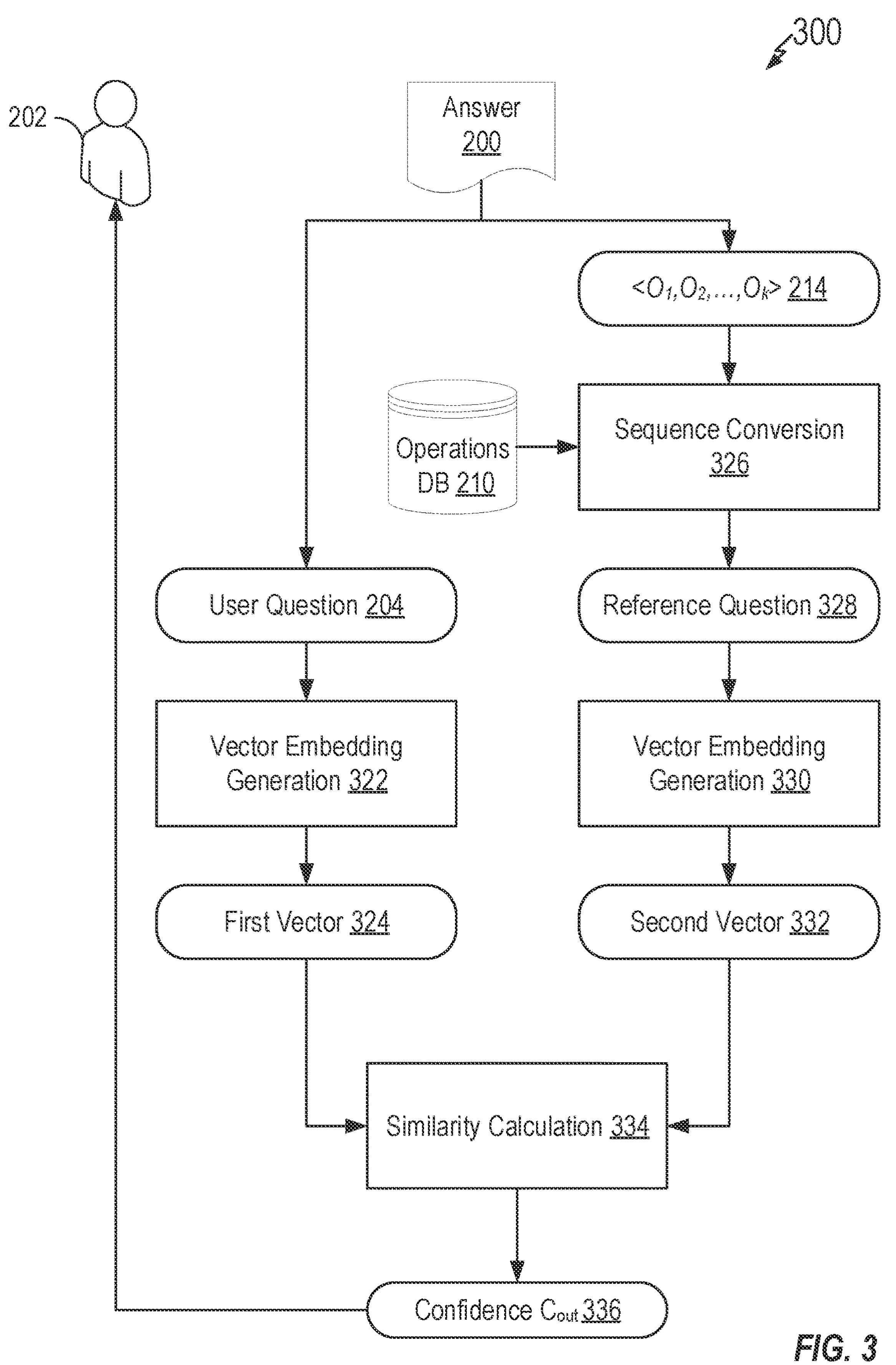
FIG. 3 depicts an example workflow for generating a confidence associated with a generated answer to a user question.

FIGS. 2 and 3 depict example workflows for answering questions associated with tabular data with a question and answering system, such as question and answering system 106 in FIG. 1.

In particular, FIG. 2 depicts example workflow 200 for generating an answer, in response to a user question 204, posed by a user 202, for example, "What was revenue last week for Company Z?"

Aspects of workflow 200 may be performed by one or more components of a LLM, for example, a problem formulation component, an operations component, and an execution component, which may be examples of problem formulation component 108, operations component 110, and execution component 114 in FIG. 1.

Workflow 200 begins at block 206 with translating user question 204 to a structured input 208. For example, structured input Q, consists of a sequence of $r$ tokens, $q_1, \ldots, q_r$. Block 206 may be performed by a problem formulation component of an LLM, for example, problem formulation component 108 in FIG. 1. In embodiments, the structured input 208 may further comprise metadata dictionary information, e.g., regarding metadata dictionary 122, data operation information, e.g., regarding data operations in operations database 112, and few-shot examples.

The structured input Q 208 is processed at block 212 to generate a sequence of operations 214. The sequence of operations 214 comprises a set of data operations, which when executed on an associated dataset (e.g., dataset 218) answers the user question 204. Block 212 may be performed by an operations component of a LLM, for example, operations component 110 in FIG. 1.

The data operations are selected from operations database 210, which may be an example of operations database 112 in FIG. 1. Operations database 210 comprises a set of parameterized basis functions in which each function encodes a data operation with a set of associated parameters. The data operations may include, for example, filtering operations, aggregation operations, trend operations, anomaly operations, and the like, for tabular data.

As described herein, the number of parameterized functions may be reduced to the minimum set necessary for answering user questions through composition of one or more of the functions. For example, the number of parameterized functions defined in operations database 210 may be from about 10-15 in one example.

A metadata dictionary $\mathcal{M}$ associated with the tabular dataset $\mathcal{D}$ 218 may be previously defined. The sequence of operations 214 is generated based on the structured input 208 Q, the operations database 210 $\mathcal{F}$, the metadata dictionary, $\mathcal{M}$. In particular, the sequence of operations 214 comprises one or more data operations to be carried out in the determined order to generate an output.

The sequence of operations 214 may be generated by iteratively selecting data operations from operations database 210 to generate an ordered sequence of operations, which, when executed over dataset 218, generate the output responsive to the structured input Q. The trained LLM first selects a data operation configured to generate the output responsive to the structured input Q. The data operation may be a final data operation, e.g., $O_k$. The operations component is trained to select the ordered sequence of operations resulting in the final data operation which will generate the responsive output. Next, the penultimate data operation, e.g., $O_{k-1}$, is selected based on the input to final data operation, e.g., $O_k$, to generate the responsive output. Additional prior data operations are selected based on their ability to generate an output to be used as an input in the subsequent data operation. Thus, a sequence of operations is generated, whereby the output of the prior operation is used as an input to the subsequent operation, until an output responsive to the structured input Q, is generated. Generation of the sequence of operations is constrained by a metadata dictionary, $\mathcal{M}$ which identifies the parameters of each column of the dataset 218 and thus, the data in the dataset 218 which may be used to generate the output.

As an illustrative example, for user question "What was revenue for January for Company Z?" regards a tabular dataset (e.g., dataset 218) containing records of invoice data, such as a date/time of a record, a type of record (e.g., invoice), a name, an invoice amount, and the like. Based on the question, the metadata dictionary, and the available data operations, the sequence of data operations may comprise: a summation operation of invoice amounts, an identification operation of the invoice amounts, and a filtration operation of invoice amounts for the date range.

At block 216, the sequence of operations 214 is executed, for example by an execution component of an LLM, such as executions component 114 in FIG. 1, over the tabular dataset $\mathcal{D}$, 218 to generate an output 220 $\mathcal{T}_{out}$, which answers the user question 204. For each data operation 5 in the sequence of operations, the associated parameters are determined, referenced with the metadata dictionary $\mathcal{M}$ to identify the column(s) in the tabular dataset $\mathcal{D}$ for the associated parameters and then the data operation is executed using the values in the column(s). These steps may be repeated for each data operation in the sequence. In some embodiments, the output of the first data operation, e.g., $O_1(\mathcal{D})$, is used to execute the subsequent data operation, and so forth, until the entire sequence of operations $$< O_k(O_{k-1}(O_1(\mathcal{D}))) >$$

has been executed to generate the output 220.

Returning to the previous example, for user question "What was revenue for January for Company Z?" the generated sequence of operations comprises an ordered sequence of data operations to determine revenue for the month of January for Company Z. Specifically, exemplary execution of the sequence of operations for the tabular dataset containing invoice information may include a first operation $O_1(\mathcal{D})$ of filtering the tabular dataset $\mathcal{D}$ by date and time to limit the dataset to invoices billed in January, thereby the output is all data within the data range. The next operation $O_2(O_1(\mathcal{D}))$ may include selecting the column of the data within the data range comprising an invoice amount, thereby the output is of the column of invoice amounts. The final operation $$O_3(O_2(O_1(\mathcal{D})))$$

may include summing the values of the column of invoice amounts.

This output 220 may be provided to user 202 in response to user question 204. In some embodiments, a natural language response may be generated based on output 220 and the natural language response is provided to user 202. Returning to the previous example, the output 220 may be, "$234,678.91" and a natural language response may be, "Company Z's total revenue for January was $234,678.91."

Furthermore, user question 204 and the sequence of operations 214 may be used as part of confidence workflow 300, described in FIG. 3.

In particular, FIG. 3 depicts an example workflow 300 for generating a confidence $C_{out}$ associated with output 220 based on the user question 204 and the sequence of operations 214. Aspects of workflow 300 may be performed by one or more components of a LLM, for example, a confidence component, which may be an example of confidence component 116 in FIG. 1.

As described herein, user questions may be ambiguous, or inexact, for example, "What was revenue for January for Company Z?" may also be asked, "How much money did we bring in last month?" However, the second version does not directly implicate a revenue calculation because it does not state "revenue" in the question. Thus, a confidence score associated with the output 220 may indicate a reliability of the output in answering the user's question, especially where the user question may be ambiguous.

At block 322, a first vector 324 is generated based on user question 204, which user 202 created and submitted as part of workflow 200. First vector 324 embeds user question 204 as a 1-dimensional vector e. First vector 324 (i.e., vector e) may be generated using a pre-trained SentenceTransformer, for example, embedding model 118 in FIG. 1.

At block 326, the sequence of operations 214, generated as part of workflow 200 in FIG. 2, is converted to reference question 328. Reference question 328 is the "ideal" question that a user would ask to get output 220 in response. For example, a reference question for a revenue calculation may be "What is the summation of all invoice amounts billed during the last month?"

Reference question 328 is generated through LLM code explanation. Reference question 328 may also be referred to as reference question Q':

$$< O_1, O_2, \ldots O_k > \Rightarrow Q'$$

The trained model may identify the summary or explanation associated with an operation in operations database 210. For example, $O_1$ may be a summation operation, $O_2$ may be a count operation, and so forth for each operation in the sequence. The trained model may further use NLP to generate a natural language reference question based on the summaries of the operations. Further, in some embodiments, the reference question may be based on the ordered sequence of the operations. At block 330, a second vector 332 is generated based on reference question 328. Second vector 332 embeds reference question 328 (i.e., reference question Q') as a 1-dimensional vector e'. Second vector 332 (i.e., vector e') may be generated using the pre-trained SentenceTransformer, for example, embedding model 118 in FIG. 1.

At block 334, confidence score 336 is generated based on a similarity calculation between first vector 324 and second vector 332. For example, confidence score 336 may be generated based on the distance between the two embedded vectors, e.g., vector e and vector e'. For example, a small distance between the two embedded vectors indicates high similarity. Thus, the question posed by the user and the question the model answered are highly similar. A large distance between the two embedded vectors indicates low similarity. In such cases, the question posed by the user and the question the model answered are less similar. Confidence score 336 may be determined based on this similarity calculation. For example, a high similarity between the user question and the reference question indicates a higher confidence in output 220. A low similarity between the user question and the reference question indicates a lower confidence in output 220.

Confidence score 336 may be provided to user 202, along with output 220 in response to user question 204. Beneficially, confidence score 336 may quantify the certainty in output 220, thereby informing user 202 as to the reliability of the output 220. As described herein, generating a confidence score associated with the answer is especially beneficial where the user question may be ambiguous.

Note that FIGS. 2 and 3 are just examples of workflows, and other flows including fewer, additional, or alternative steps are possible consistent with this disclosure.

Example Method for Answering Questions on Tabular Datasets

Figure 4:
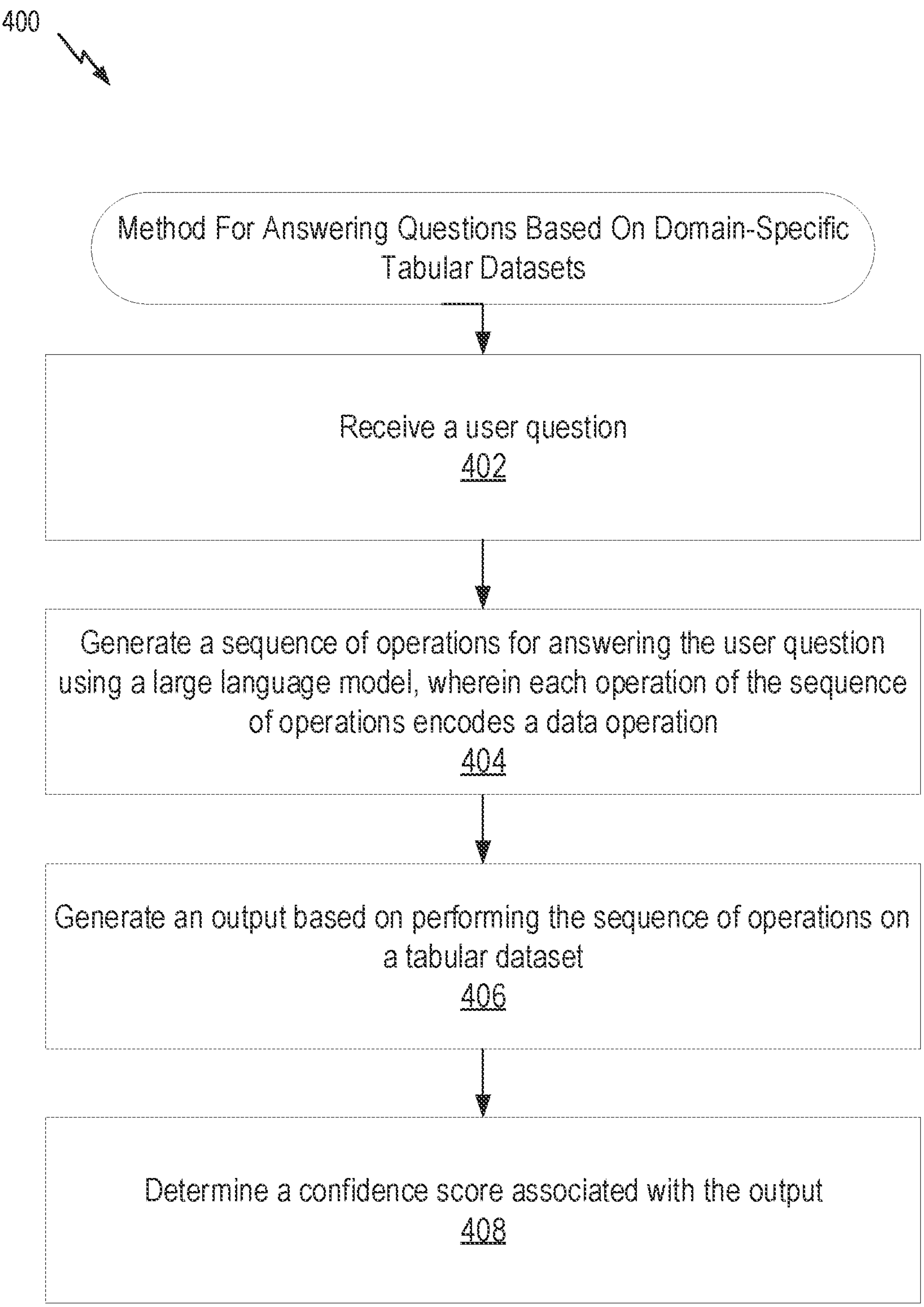
FIG. 4 depicts an example method for answering questions on domain-specific tabular datasets.

FIG. 4 depicts an example method 400 for answering questions on domain-specific tabular datasets, such as with question and answering system 100 described herein.

Initially, method 400 begins at step 402 with receiving a user question regarding a domain-specific tabular dataset, for example, as described with respect to user question 204 in FIG. 2.

Method 400 proceeds to step 404 with generating a sequence of operations for answering the user question using a large language model, wherein each operation of the sequence of operations encodes a data operation, for example, as described with respect to block 212 in FIG. 2.

In some embodiments, the sequence of operations comprises one or more of: a filtering operation; an aggregation operation; a trend operation; or an anomaly operation.

In some embodiments, generating the sequence of operations for answering the user question using the large language model, comprises: selecting, from a set of parameterized basis functions, a final data operation, wherein the final data operation generates a response to the user question; and selecting, from the set of parameterized basis functions, one or more prior data operations, wherein the one or more prior operations generate one or more prior outputs to be used by the final data operation to generate the response to the user question.

Method 400 then proceeds to step 406 with generating an output based on performing the sequence of operations on a tabular dataset, for example, as described with respect to block 216 in FIG. 2.

In some embodiments, generating the output based on performing the sequence of operations on a tabular dataset further comprises: for each data operation in the sequence of operations: determining one or more parameters associated with the data operation; referencing a metadata dictionary associated with the tabular dataset for each parameter of the one or more parameters associated with the data operation; identifying a value from the tabular dataset for each parameter of the one or more parameters associated with the data operation based on the metadata dictionary; and operating the data operation based on the identified value from the tabular dataset for each parameter of the one or more parameters; and processing each data operation in the sequence of operations.

In some embodiments, the method further comprises generating a natural language answer to the user question based on the output.

Method 400 then proceeds to step 408 with determining a confidence score associated with the output, for example, as described with respect to workflow 300 in FIG. 3.

In some embodiments, determining the confidence score associated with the output comprises: converting the sequence of operations to a reference question, such as at block 326; generating a first embedding vector representing the reference question, such as at block 330; generating a second embedding vector representing the user question, such as at block 322; and generating the confidence score based on the difference between the first embedding vector and the second embedding vector, such as at block 334. In some embodiments, the reference question is a question for which the sequence of operations answers.

Note that FIG. 4 is just one example of a method, and other methods including fewer, additional, or alternative steps are possible consistent with this disclosure.

Example Processing System for Question and Answering

Figure 5:
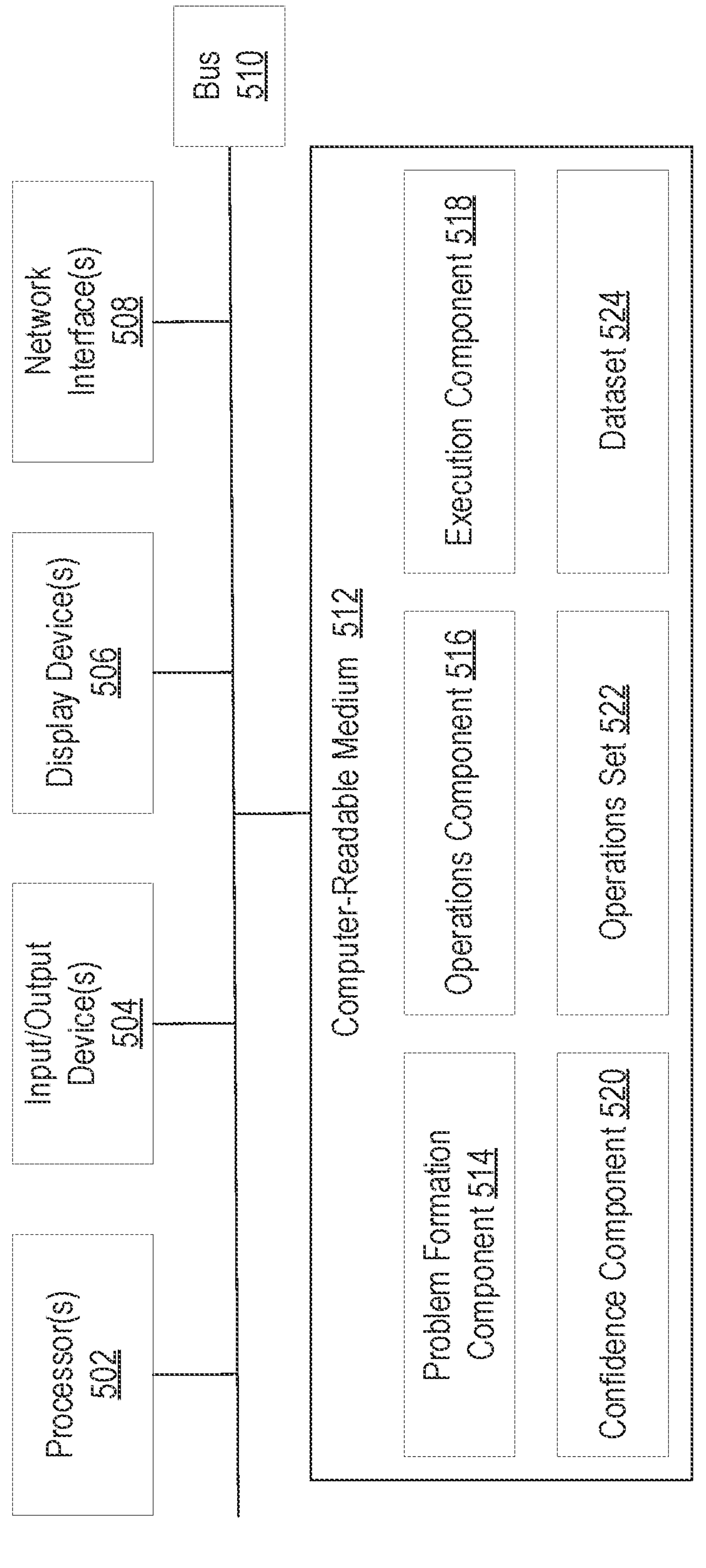
FIG. 5 depicts an example processing system with which aspects of the present disclosure can be performed.

FIG. 5 depicts an example processing system 500 configured to perform various aspects described herein, including, for example, workflow 200, and workflow 300 described with respect to FIGS. 2, and 3, and method 400 described with respect to FIG. 4.

Processing system 500 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of one or more central processing units (CPUs), graphics processing units (GPUs), tensor processing units (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 506 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes a problem formaulation component 514, an operations component 516, an execution component 518, a confidence component 520, an operations set 522, and a dataset 524.

In certain embodiments, a problem formulation component 514 is configured to translate natural language user questions to structured inputs, for example, as described with respect to block 206 in FIG. 2.

In certain embodiments, an operations component 516 is configured to generate a sequence of operations for answering the user question using a large language model, wherein each operation of the sequence of operations encodes a data operation, for example, as described with respect to block 212 in FIG. 2, and step 404 in FIG. 4. In certain embodiments, an operations component 516 is further configured to convert the sequence of operations to a reference question, for example, as described with respect to block 326 in FIG. 3. Data operations used by operations component 516 may be stored in operations set 522.

In certain embodiments, an execution component 518 is configured to generate an output based on performing the sequence of operations on a tabular dataset, for example, as described with respect to block 216 in FIG. 2, and step 406 in FIG. 4. The tabular dataset may be stored as dataset 524.

In certain embodiments, a confidence component 520 is configured to determine a confidence score associated with the output, for example, as described with respect to block 216 in FIG. 2, and step 406 in FIG. 4.

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A computer-implemented method for answering questions on domain-specific tabular datasets, comprising: receiving a user question regarding a domain-specific tabular dataset; generating a sequence of operations for answering the user question using a large language model, wherein each operation of the sequence of operations encodes a data operation; generating an output based on performing the sequence of operations on a tabular dataset; and determining a confidence score associated with the output.

Clause 2: The computer-implemented method of Clause 1, wherein determining the confidence score associated with the output comprises: converting the sequence of operations to a reference question; generating a first embedding vector representing the reference question; generating a second embedding vector representing the user question; and generating the confidence score based on a difference between the first embedding vector and the second embedding vector.

Clause 3: The computer-implemented method of Clause 2, wherein the reference question is a question for which the sequence of operations answers.

Clause 4: The computer-implemented method of any one of Clauses 1-3, wherein the sequence of operations comprises one or more of: a filtering operation; an aggregation operation; a trend operation; or an anomaly operation.

Clause 5: The computer-implemented method of any one of Clauses 1-4, wherein generating the output based on performing the sequence of operations on a tabular dataset further comprises: for each data operation in the sequence of operations: determining one or more parameters associated with the data operation; referencing a metadata dictionary associated with the tabular dataset for each parameter of the one or more parameters associated with the data operation; identifying a value from the tabular dataset for each parameter of the one or more parameters associated with the data operation based on the metadata dictionary; and operating the data operation based on the identified value from the tabular dataset for each parameter of the one or more parameters; and processing each data operation in the sequence of operations.

Clause 6: The computer-implemented method of any one of Clauses 1-5, further comprising generating a natural language answer to the user question based on the output.

Clause 7: The computer-implemented method of any one of Clauses 1-6, wherein generating the sequence of operations for answering the user question using the large language model, comprises: selecting, from a set of parameterized basis functions, a final data operation, wherein the final data operation generates a response to the user question; and selecting, from the set of parameterized basis functions, one or more prior data operations, wherein the one or more prior operations generate one or more prior outputs to be used by the final data operation to generate the response to the user question.

Clause 8: A processing system, comprising: a memory comprising computer-executable instructions; and a processor configured to execute the computer-executable instructions and cause the processing system to perform a method in accordance with any one of Clauses 1-7.

Clause 9: A processing system, comprising means for performing a method in accordance with any one of Clauses 1-7.

Clause 10: A non-transitory computer-readable medium storing program code for causing a processing system to perform the steps of any one of Clauses 1-7.

Clause 11: A computer program product embodied on a computer-readable storage medium comprising code for performing a method in accordance with any one of Clauses 1-7.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for answering questions on domain-specific tabular datasets, comprising:

receiving a user question regarding a domain-specific tabular dataset;

generating a sequence of operations for answering the user question using a large language model, wherein each operation of the sequence of operations encodes a data operation, comprising:

selecting, from a set of parameterized basis functions, a final data operation, wherein the final data operation generates a response to the user question, and wherein each parameterized basis function of the set of parameterized basis functions comprises an operation and at least one parameter associated with data of the domain-specific tabular dataset; and selecting, from the set of parameterized basis functions, one or more prior data operations, wherein the one or more prior data operations generate one or more prior outputs to be used by the final data operation to generate the response to the user question;

generating an output based on performing the sequence of operations on a tabular dataset, comprising:

for each data operation in the sequence of operations:

determining one or more parameters associated with the data operation;

referencing a metadata dictionary associated with the tabular dataset for each parameter of the one or more parameters associated with the data operation;

identifying a value from the tabular dataset for each parameter of the one or more parameters associated with the data operation based on the metadata dictionary; and operating the data operation based on the identified value from the tabular dataset for each parameter of the one or more parameters; and processing each data operation in the sequence of operations; and determining a confidence score associated with the output; and generating a natural language answer to the user question based on the output and the confidence score.

2. The computer-implemented method of claim 1, wherein determining the confidence score associated with the output comprises:

converting the sequence of operations to a reference question;

generating a first embedding vector representing the reference question;

generating a second embedding vector representing the user question; and generating the confidence score based on a difference between the first embedding vector and the second embedding vector.

3. The computer-implemented method of claim 2, wherein the reference question is a question for which the sequence of operations answers.

4. The computer-implemented method of claim 1, wherein the sequence of operations comprises one or more of: a filtering operation; an aggregation operation; a trend operation; or an anomaly operation.

5. A processing system, comprising: a memory comprising computer-executable instructions; and a processor configured to execute the computer-executable instructions and cause the processing system to:

receive a user question regarding a domain-specific tabular dataset;

generate a sequence of operations for answering the user question using a large language model, wherein each operation of the sequence of operations encodes a data operation, comprising:

selecting, from a set of parameterized basis functions, a final data operation, wherein the final data operation generates a response to the user question, and wherein each parameterized basis function of the set of parameterized basis functions comprises an operation and at least one parameter associated with data of the domain-specific tabular dataset; and selecting, from the set of parameterized basis functions, one or more prior data operations, wherein the one or more prior data operations generate one or more prior outputs to be used by the final data operation to generate the response to the user question;

generate an output based on performing the sequence of operations on a tabular dataset, comprising:

for each data operation in the sequence of operations:

determining one or more parameters associated with the data operation;

referencing a metadata dictionary associated with the tabular dataset for each parameter of the one or more parameters associated with the data operation;

identifying a value from the tabular dataset for each parameter of the one or more parameters associated with the data operation based on the metadata dictionary; and operating the data operation based on the identified value from the tabular dataset for each parameter of the one or more parameters; and processing each data operation in the sequence of operations; and determine a confidence score associated with the output; and generate a natural language answer to the user question based on the output and the confidence score.

6. The processing system of claim 5, wherein in order to determine the confidence score associated with the output the processor is further configured to cause the processing system to:

convert the sequence of operations to a reference question;

generate a first embedding vector representing the reference question;

generate a second embedding vector representing the user question; and generate the confidence score based on a difference between the first embedding vector and the second embedding vector.

7. The processing system of claim 6, wherein the reference question is a question for which the sequence of operations answers.

8. The processing system of claim 5, wherein the sequence of operations comprises one or more of: a filtering operation; an aggregation operation; a trend operation; or an anomaly operation.

9. A computer-implemented method for answering questions on domain-specific tabular datasets, comprising:

receiving a user question regarding a domain-specific tabular dataset;

generating a sequence of operations for answering the user question using a large language model, wherein each operation of the sequence of operations encodes a data operation, comprising:

selecting, from a set of parameterized basis functions, a final data operation, wherein the final data operation generates a response to the user question, and wherein each parameterized basis function of the set of parameterized basis functions comprises an operation and at least one parameter associated with data of the domain-specific tabular dataset; and selecting, from the set of parameterized basis functions, one or more prior data operations, wherein the one or more prior data operations generate one or more prior outputs to be used by the final data operation to generate the response to the user question;

generating an output based on performing the sequence of operations on a tabular dataset, comprising:

for each data operation in the sequence of operations:

determining one or more parameters associated with the data operation;

referencing a metadata dictionary associated with the tabular dataset for each parameter of the one or more parameters associated with the data operation;

identifying a value from the tabular dataset for each parameter of the one or more parameters associated with the data operation based on the metadata dictionary; and operating the data operation based on the identified value from the tabular dataset for each parameter of the one or more parameters; and processing each data operation in the sequence of operations;

determining a confidence score associated with the output, comprising:

converting the sequence of operations to a reference question;

generating a first embedding vector representing the reference question;

generating a second embedding vector representing the user question; and generating the confidence score based on a difference between the first embedding vector and the second embedding vector; and generating a natural language answer to the user question based on the output and the confidence score, wherein the confidence score is provided with the natural language answer.

10. The computer-implemented method of claim 9, wherein the reference question is a question for which the sequence of operations answers.

11. The computer-implemented method of claim 9, wherein the sequence of operations comprises one or more of: a filtering operation; an aggregation operation; a trend operation; or an anomaly operation.

12. The computer-implemented method of claim 1, further comprising:

translating, using the large language model, the user question regarding the domain- specific tabular dataset into a structured input comprising a sequence of tokens, wherein the structured input used by the large language model to generate the sequence of operations.

13. The computer-implemented method of claim 1, wherein generating the sequence of operations for answering the user question using the large language model further comprise determining an order for each operation of the sequence of operations.

14. The computer-implemented method of claim 2, wherein converting the sequence of operations to a reference question comprises:

identifying a summary associated with each operation in the sequence of operations; and generating, using natural language processing, the reference question as a natural language reference question based on the summary associated with each operation in the sequence of operations.

15. The computer-implemented method of claim 2, wherein generating the confidence score based on the difference between the first embedding vector and the second embedding vector comprises determining a difference between the first embedding vector and the second embedding vector.

16. The computer-implemented method of claim 9, further comprising:

translating, using the large language model, the user question regarding the domain-specific tabular dataset into a structured input comprising a sequence of tokens, wherein the structured input used by the large language model to generate the sequence of operations.

17. The computer-implemented method of claim 9, wherein generating the sequence of operations for answering the user question using the large language model further comprise determining an order for each operation of the sequence of operations.

18. The computer-implemented method of claim 10, wherein converting the sequence of operations to a reference question comprises:

identifying a summary associated with each operation in the sequence of operations; and generating, using natural language processing, the reference question as a natural language reference question based on the summary associated with each operation in the sequence of operations.

* * * * *